Figure 1:
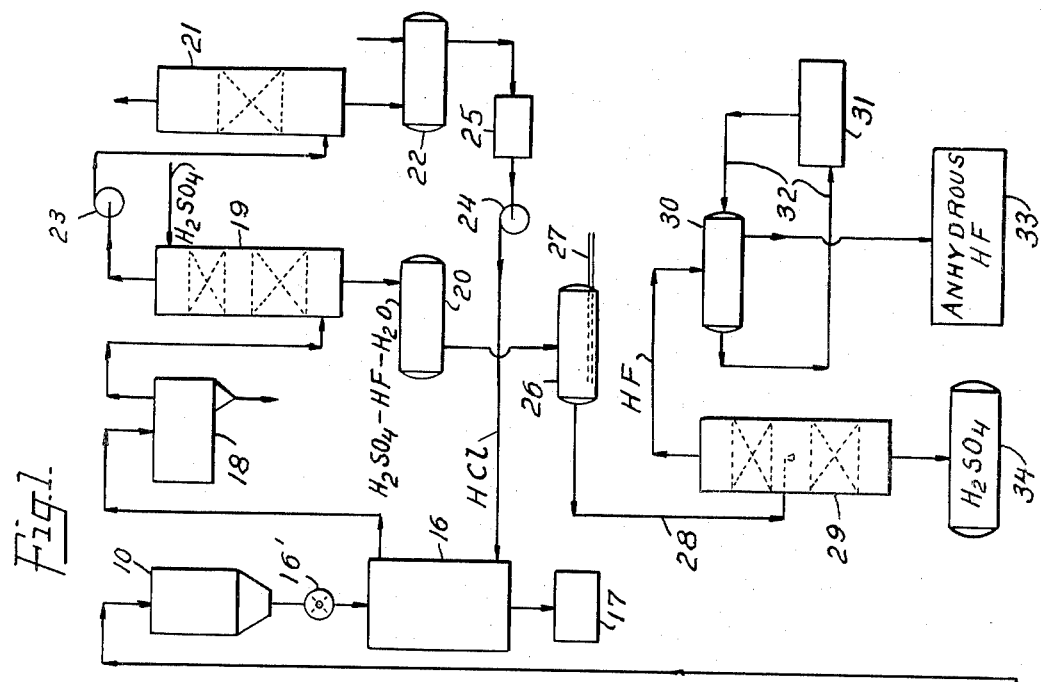
Figure 1:
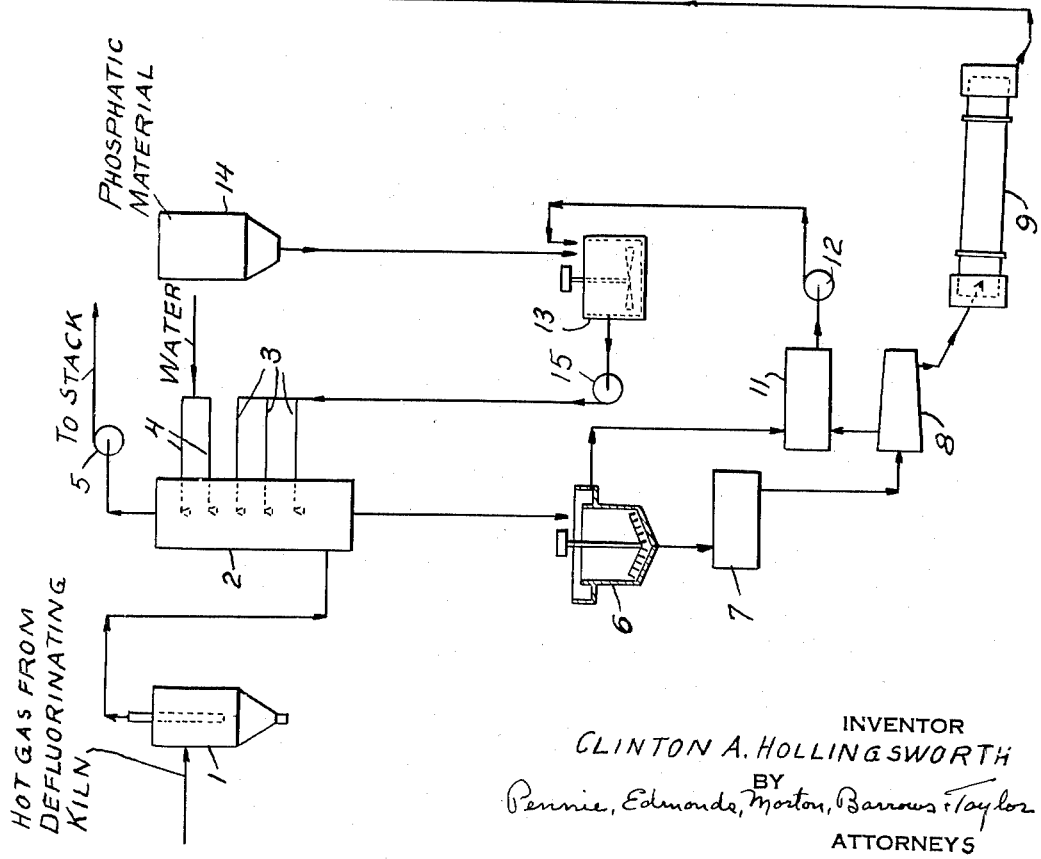

July 3, 1956

C. A. HOLLINGSWORTH 2,753,253

TREATMENT OF PHOSPHATE ROCK

Filed Oct. 15, 1952

3 Sheets-Sheet 1

INVENTOR
CLINTON A. HOLLINGSWORTH
BY
Pennie, Edmonds, Morton, Barrows & Taylor
ATTORNEYS July 3, 1956

C. A. HOLLINGSWORTH 2,753,253

TREATMENT OF PHOSPHATE ROCK

Filed Oct. 15, 1952

3 Sheets-Sheet 2

INVENTOR
CLINTON A. HOLLINGSWORTH
BY
Pennie, Edmonds, Morton, Barrows & Taylor
ATTORNEYS July 3, 1956
C. A. HOLLINGSWORTH
2,753,253
TREATMENT OF PHOSPHATE ROCK
Filed Oct. 15, 1952
3 Sheets-Sheet 3
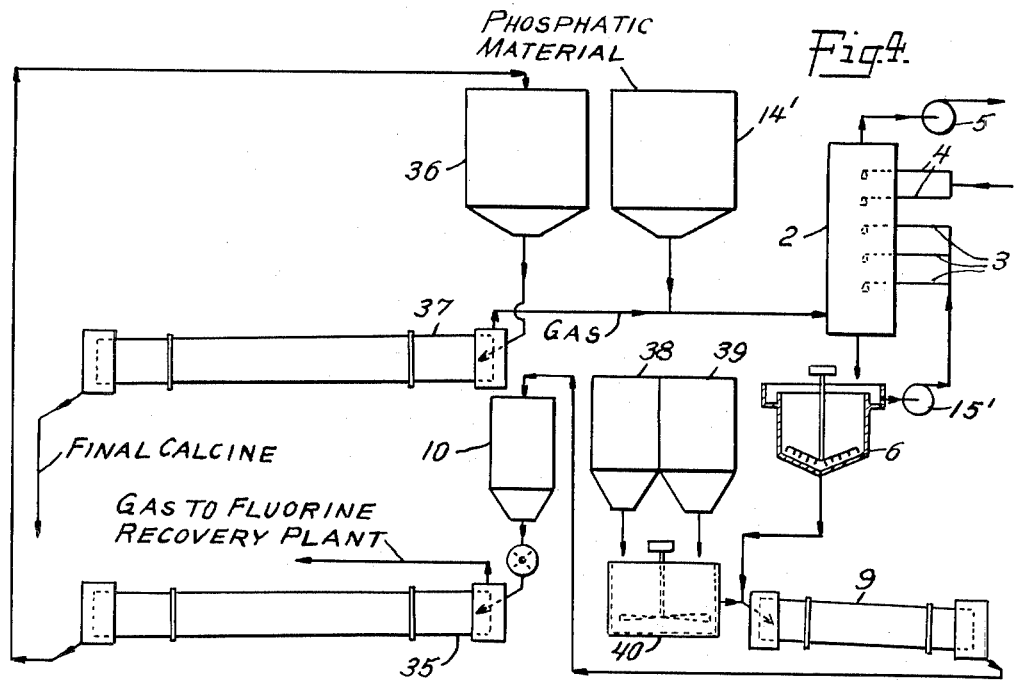
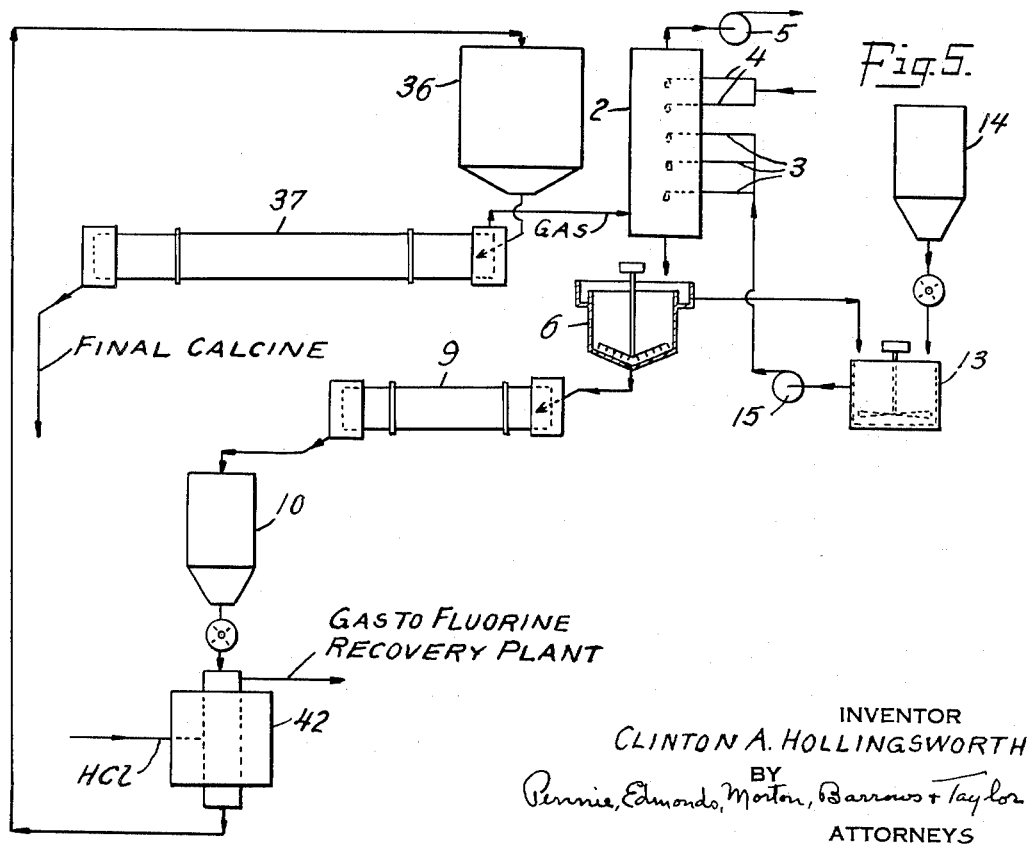
INVENTOR
CLINTON A. HOLLINGSWORTH
BY
Pennie, Edmonds, Morton, Barrows & Taylor
ATTORNEYS

United States Patent Office 2,753,253
Patented July 3, 1956

2,753,253

TREATMENT OF PHOSPHATE ROCK

Clinton A. Hollingsworth, Lakeland, Fla., assignor, by mesne assignments, to Smith-Douglass Company, Incorporated, Norfolk, Va., a corporation of Virginia Application October 15, 1952, Serial No. 314,842

8 Claims. (Cl. 71—44)

This invention relates to the treatment of phosphate rock and similar natural phosphatic materials, and has for its principal object the recovery of fluorine therefrom. More particularly the invention aims to build-up or increase the usual fluorine content of such materials as an aid in the recovery of fluorine. Another object of the invention is the provision of improved coordinated two-stage calcination processes for defluorinating phosphatic material in which the recovery of fluorine is promoted by increasing the fluorine content of the raw material. A further special object of the invention is the preparation of a particularly suitable phosphatic material of built-up or increased fluorine content for treatment by the method of my copending application for Letters Patent of the United States, Ser. No. 303,270, filed Aug. 8, 1952, for the recovery therefrom of fluorine, phosphorus and other values.

Fluorine is present in practically all natural phosphate rocks, in amount varying in the different areas in which the rock occurs. The common Florida phosphate rocks (e. g. pebble rock) usually contain from 3.5 to 4% of fluorine. The fluorine is commonly believed to be present as calcium fluoride ($CaF_2$) largely combined with tricalcium phosphate as calcium fluorphosphate or fluorapatite ($Ca_{10}F_2(PO_4)_6$), and this combination is believed to be responsible for the low fertilizer availability of the raw rock. Moreover, the high fluorine content of the raw rock makes it unsuitable as a mineral supplement for animal feed. The apatite lattice can be broken and the fluorine volatilized by calcining the rock at an elevated temperature (generally around 250–2700° F.) in an atmosphere of water vapor and in the presence of various additive agents to impart to the calcining charge sufficient refractoriness to withstand the high calcining temperature without substantial fusion or sintering. Various proposals have heretofore been made for recovering the fluorine from the exhaust gas of the defluorinating calcination, but the very great dilution of fluorine therein has heretofore made such recovery economically impracticable.

While the present invention is primarily concerned with the recovery of fluorine from the exhaust gases of the aforementioned methods of defluorinating phosphatic materials by calcination, unlike previous proposals it makes no attempt to produce a predominately fluorine product directly from the exhaust gas of a final high temperature (e. g. second stage) defluorinating calcination. On the contrary, the invention contemplates reacting the fluorine content of such exhaust gas with a fluorine-containing natural phosphatic material and thereby building-up and increasing the fluorine content of the material. The resulting material of increased fluorine content is then subjected to a fluorine-recovery calcination, by any suitable method, and the higher fluorine content of the exhaust gas of that calcination promotes and economically contributes to the recovery therefrom of fluorine in marketable form.

The invention, in its broad aspect, involves increasing the fluorine content of a fluorine-containing phosphatic material by passing the exhaust gas from the defluorinating calcination of another phosphatic material into contact with the material whose fluorine content is to be increased whereby the gaseous fluorine compound or compounds in the exhaust gas react with free metal compounds or other constituents, or both, in the latter material to form a solid fluorine compound or compounds (e. g. fluorides) which are retained with the material and thereby increase or enrich its fluorine content. The thus fluorine-enriched phosphatic material is then suitably treated by calcination to recover the fluorine added thereto by the method of the invention and part or substantially all of its natural fluorine content, depending upon the nature of the fluorine-recovery calcination.

By free metal compounds is meant compounds not combined with phosphate and capable of reacting with the fluorine compound (usually hydrogen fluoride or hydrofluoric acid-HF) in the exhaust gas to form fluorides, and other constituents include silica ($SiO_2$) which reacts with hydrogen fluoride and calcium or sodium compounds to form calcium fluosilicate ($CaSiF_6$) or sodium fluosilicate ($Na_2SiF_6$), respectively. Such free metal compounds commonly present in most phosphate rocks are lime (CaO) usually present in the raw rock as limestone ($CaCO_3$), ferric oxide ($Fe_2O_3$), aluminum oxide ($Al_2O_3$) and minor amounts of the oxides of magnesium, sodium and potassium. Florida pebble rocks commonly contain by analysis from 3 to 5% of free lime and from 1.5 to 3% of iron and aluminum oxides readily available for reaction with hydrogen fluoride to form the corresponding metal fluorides. Such rocks also contains 3 to 7% of silica which, under favorable conditions, may be capable of reacting with hydrofluoric acid and alkali and alkali earth metals to form the corresponding metal fluosilicates. By the method of the invention, such amounts of free metal compounds and silica are capable of doubling the fluorine content of the phosphatic material. A small amount of lime or the like may be mixed with the phosphatic material to increase its capacity of absorbing fluorine, and by such expedient the total fluorine content of the fluorine-enriched material may be brought up to 10–15%.

In most phosphate rocks, substantially all of the fluorine is believed to be present in the apatite lattice. About one-half of this fluorine is removed with comparative ease by calcination in the presence of water vapor, but the removal of the last one-third or so of the fluorine is much more difficult. The fluorine that is added to the phosphatic material by the method of the invention is present for the most part as free metal fluorides, and such added fluorine is as readily removed by calcination as the so-called "easy" fluorine of the natural phosphatic material. Hence, in a subsequent fluorine-recovery calcination of the fluorine-enriched phosphatic material, produced by the invention, not only is the concentration of fluorine in the exhaust gas very considerably increased, but more than 75% of the total fluorine is removed with comparative ease.

In plant practice using rotary kilns in a two-stage defluorinating calcination, the second stage kiln (called the defluorinating kiln) is fed with partially defluorinated calcine from the first stage kiln and the exhaust gas of the defluorinating kiln is passed into contact with raw phosphatic material to increase its fluorine content and thereby produce a fluorine-enriched phosphatic product, in accordance with the present invention. The resulting fluorine-enriched product is then subjected to a defluorinating calcination in the first stage kiln (called the fluorine recovery kiln) and the exhaust gas of relatively high fluorine content is passed to a fluorine recovery plant where the fluorine is recovered from the gas in the form of predominantly fluorine products.

The fluorine-enriched phosphatic product may be subjected to any other suitable process for the recovery of fluorine. For example, it may constitute the feed in the process of my copending patent application Ser. No. 310,207, filed Sept. 18, 1952, in which the phosphatic material is subjected to heat-treatment in two stages the first of which is conducted in the presence of a chlorine-containing agent (e. g. hydrogen chloride gas-HCl) and a large part of the fluorine of the fluorapatite is replaced by chlorine with volatilization of the replaced fluorine and the product of the first stage is directly and without cooling subjected to the second stage in which a major part of its chlorine content is volatilized. The volatilized fluorine is recovered in marketable form. The partially defluorinated calcine may then be substantially completely defluorinated in a defluorinating kiln and the exhaust gas thereof utilized to produce a fluorine-enriched phosphatic product, in accordance with the present invention.

The present invention is of special advantage in preparing a phosphatic feed material for the practice of that method of recovering fluorine and other values by calcination in a chlorine-containing atmosphere disclosed in my aforementioned patent application Ser. No. 303,270. To that end, it is my preferred practice to mix from 10 to 30% by weight of finely divided solid carbonaceous material, such as coal or coke, with finely ground phosphatic material, and to pass the exhaust gas from the defluorinating kiln through an aqueous slurry of the mixture. When the fluorine content of the phosphatic material has been enriched to the desired extent, the resulting mixture is dewatered, dried and subjected to heat-treatment in a chlorine-containing atmosphere as described in the aforementioned patent application Ser. No. 303,270. Alternatively, fluorine-enriched phosphatic material without admixed coal or the like, produced by the present invention, may be subsequently mixed with coal or equivalent carbonaceous material to prepare the feed for the method of the aforementioned patent application Ser. No. 303,270.

Figure 2:
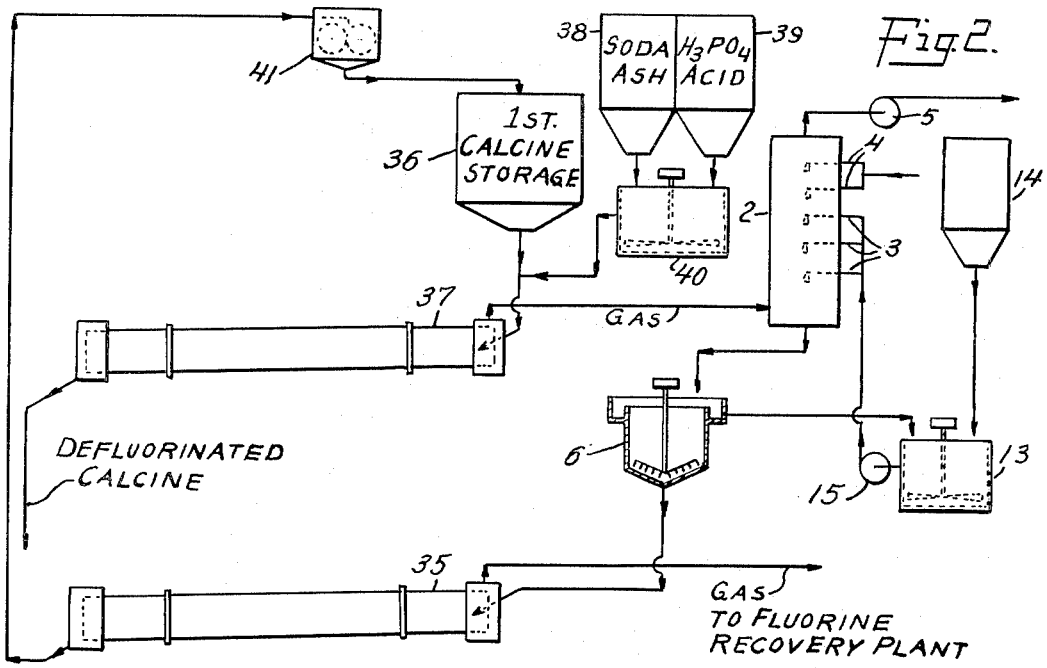
Figure 3:
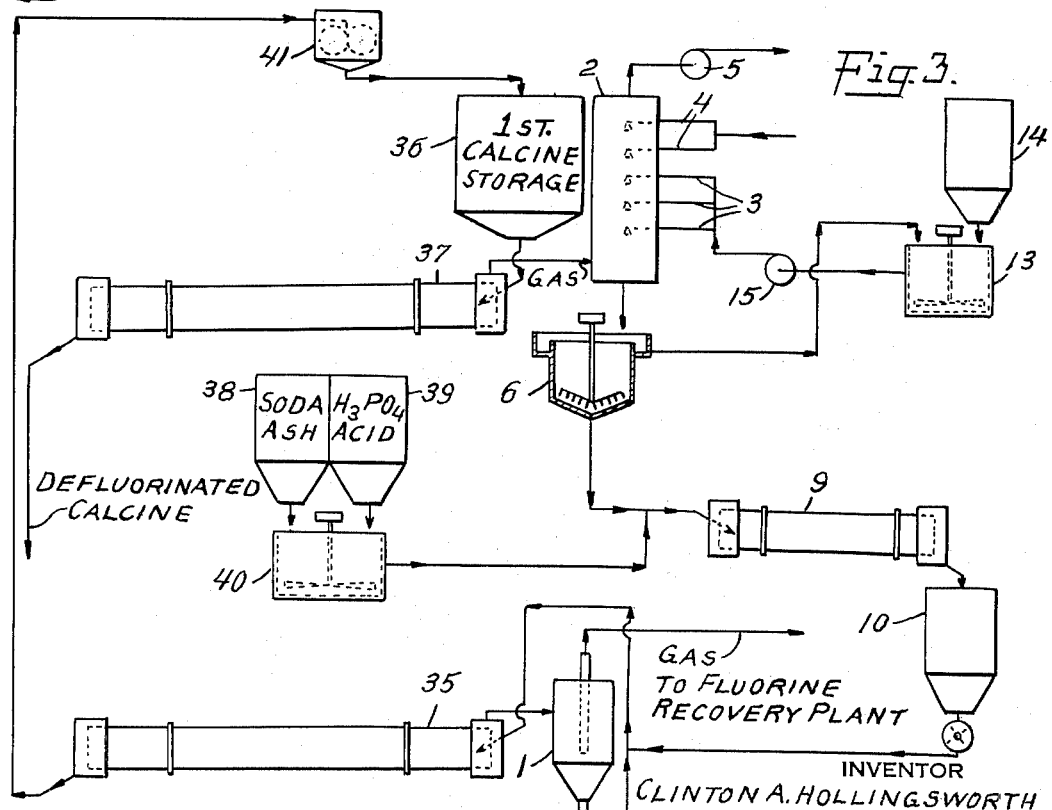

The foregoing and other objects of the invention will be better understood from the following description taken in conjunction with the accompanying drawings, in which Fig. 1 is a diagrammatic flow sheet of a plant equipment for practicing the present invention in conjunction with the recovery of fluorine and other values by the method of my aforementioned patent application Ser. No. 303,270, Figs. 2, 3 and 4 are diagrammatic flow sheets of slightly different plant equipments for practicing the present invention in a coordinated two-stage calcination process for defluorinating phosphatic material, and Fig. 5 is a diagrammatic flow sheet of a plant equipment for practicing the present invention in conjunction with the recovery of fluorine by the method of my aforementioned patent application Ser. No. 310,207.

Referring to Fig. 1 of the drawings, the hot exhaust gas from one or more defluorinating kilns (not shown) passes directly to a dust collector, such as the cyclone 1, for the removal of fine solid particles. With a defluorinating calcination temperature of 2500–2700° F., the temperature of the gas entering the cyclone is about 1000–1700° F., and each 1000 cubic feet of the gas (S. T. P.) contains about 0.6–0.7 pound of fluorine. While the removal of solid particles from the exhaust gas is unnecessary in the practice of the present invention, the cyclone or other suitable dust collector serves to recover a dust which contains reagents (for increasing the refractoriness of the defluorinating kiln charge) of sufficient value for refeeding to the defluorinating kiln.

An aqueous slurry of the phosphatic material to be fluorine-enriched is downwardly sprayed into the lower half of a wash tower 2 through a plurality of pipes 3 at different levels. Above the spray pipes 3, in the upper part of the tower, a plurality of pipes 4 spray water downwardly. The fluorine-containing exhaust gas from the defluorinating kiln enters near the bottom of the tower and passes upwardly in contact with the descending sprays of the slurry, the passage of the gas through the tower being countercurrent to the passage therethrough of the slurry and wash water. Gaseous fluorine compounds in the gas react with the free metal compounds and other constituents of the phosphatic material to form solid fluorine compounds, principally fluorides, which are retained in the material. Final traces of hydrogen fluoride are washed from the gas by the water sprays in the upper part of the tower, and the resulting dilute hydrofluoric acid descends into contact with freshly entering slurry and reacts with the phosphatic material to form solid fluorides. A blower 5 is provided for drawing the exhaust kiln gas through the cyclone and tower, and for delivering the fluorine-freed gas to a stack.

The dimensions, and especially the height, of the tower 2 and the rate of feed of phosphatic material to the tower determine the time and thoroughness of contact of the gaseous fluorine compounds with the phosphatic material, and are correlated to substantially increase the fluorine content of the phosphatic material, and to remove most of the gaseous fluorine compounds from the ascending gas. In present plant practice, a single rotary defluorinating kiln will deliver (at standard temperature and pressure) 4000–8000 cubic feet of gas per minute to the tower 2, the volume of gas depending mainly upon the size of the kiln and the temperature at which it is operated. To handle this volume of gas, the tower may advantageously be 20 to 30 feet in height with a cross-sectional area of 10 to 15 square feet, and the rate of feed of phosphatic material (e. g. Florida pebble phosphate) may be 100 to 200 pounds per minute, on a dry basis.

The slurry of fluorine-enriched phosphatic material is discharged from the bottom of the tower 2 to a de-watering apparatus, such as a thickener 6. The thickened discharge of the thickener is collected in a storage tank 7, from whence it is suitably fed to a continuous centrifuge 8. The centrifuged material is passed through a rotary dryer 9, and the dried material is conveyed to a storage bin 10. The dried fluorine-enriched material, withdrawn from the bin, is defluorinated by calcination in any appropriate manner.

The overflow of the thickener 6 is collected in a storage tank 11, together with liquid from the centrifuge 8. A pump 12 delivers liquid from the tank 11 to a mixing tank 13 in which phosphatic material from the storage bin 14 is made into an aqueous slurry containing 10–35% solids. A pump 15 conveys the aqueous slurry from the mixing tank 13 to the spray pipes 3.

When the fluorine-enriched phosphatic material is to be defluorinated by the method of my aforementioned patent application Ser. No. 303,270, it may advantageously be mixed with 10 to 30% of carbonaceous material prior to delivery to the storage bin 14. The mixture of phosphatic and carbonaceous materials is then slurred in the tank 13 and the slurry is pumped to the spray pipes 3. The dried mixture of carbonaceous material and fluorine-enriched phosphatic material is conveyed to the bin 10 as the feed in the aforementioned method. Since this method provides a particularly favorable treatment of the fluorine-enriched phosphatic material for recovering fluorine, it is illustrated in the flow sheet of Fig. 1 as one example of a suitable defluorinating calcination for the subsequent treatment of the fluorine-enriched phosphatic product produced by the method of the present invention.

The dried mixture of phosphatic and carbonaceous materials is fed into the top of a heat-treating apparatus or furnace 16 through a star-wheel feeding device 16'. Dry hydrogen chloride, or other suitable chlorine-containing gas, is introduced into the bottom of the furnace 15, and passes through the mixture counter-currentwise. Within the furnace, the mixture is heated to a temperature of 2000–2200° F. in the chlorine-containing atmosphere, resulting in the decomposition of the phosphate lattice with volatilization of phosphorus and fluorine and the formation of a molten calcium chloride ($CaCl_2$) slag. Any uranium present in the phosphatic material is associated with the calcium chloride slag, which together with other residual solid products of the heat-treatment is appropriately withdrawn from the furnace 15 into a storage bin or the like 17 for subsequent treatment. The gaseous reaction product of the heat-treatment is conveyed to the condensing equipment comprising first a condenser 18 for the phosphorus products and a succeeding condenser or absorber 19 for removing the fluorine product from the exhaust gas of the condenser 18.

The condenser 19 is of the tower type. Concentrated sulphuric acid (90% $H_2SO_4$ or higher) is sprayed or otherwise introduced into the top of the tower and passing downwardly therethrough meets the rising gas stream entering at the bottom of the tower. Fluorine compounds in the gas stream are absorbed or dissolved in the descending sulphuric acid and a mixture of sulphuric and hydrofluoric acids is withdrawn from the bottom of the tower into a storage tank 20. The exhaust gas of the condenser 19 contains the excess of the hydrogen chloride employed in the heat-treatment as well as carbon monoxide, hydrogen and probably a minor amount of carbon dioxide formed in the heat-treatment reactions. The hydrogen chloride in the exhaust gas is recovered in a condenser 21, and the condensed hydrogen chloride is collected in a storage tank 22. A pump 23 serves to draw the gaseous reaction product from the furnace 15 and to force the gas stream through the condensers 18, 19 and 21. Fresh hydrogen chloride is added as required to the storage tank 22. A pump 24 withdraws hydrogen chloride through a vaporizer 25 and delivers the resulting hydrogen chloride gas to the furnace 15.

Dry hydrochloric acid gas is the preferred chlorine-containing atmosphere of the furnace 15, although chlorine itself (in conjunction with water vapor), ammonium chloride and equivalent gaseous agents containing chlorine or hydrogen chloride in available form may be used to provide the chlorine-containing atmosphere. The amount of chlorine in the atmosphere should be in excess of that theorertically required to convert all of the calcium in the mixture undergoing heat-treatment to calcium chloride, and in practice an amount of chlorine equivalent to from 50 to 150 parts by weight for each 100 parts by weight of the charge mixture is used to provide the chlorine-containing atmosphere.

The mixture of sulphuric and hydrofluoric acids is supplied from the storage tank 20 to a boiler 26 heated by an internal steam coil 27 or otherwise suitably heated. The acids and water vapor are distilled or volatilized in the boiler 26, and the mixed vapor is conducted through a pipe 28 into a fractionating column or tower 29 about midway of its height. Hydrogen fluoride is volatilized and sulphuric acid is condensed in the tower 29. The hydrogen fluoride vapor withdrawn from the top of the tower 29 is liquified in a condenser 30 maintained at the necessary low temperature by a circulating cooling agent, such as refrigerated brine, supplied by a refrigerating unit 31 and cooperating cooling coil circuit 32. The condensed anhydrous hydrogen fluoride is discharged from the condenser 30 to a storage receptacle 33. The spent sulphuric acid is withdrawn from the bottom of the tower 29 into a storage tank 34, and is reused in the condenser 19. The small amount of water vapor inevitably present or formed during the heat-treatment in the furnace 15 is included in the gaseous reaction product, and is absorbed or dissolved in the mixture of sulphuric and hydrofluoric acids withdrawn from the condenser 19. The water vapor accompanies the sulphuric acid and if and when the concentration of spent acid in the storage tank 34 drops to about 70% $H_2SO_4$ it is reconcentrated or discarded.

The flow sheet of Fig. 2 represents a plant practice in which the fluorine-enriched phosphatic material is fed, in the form of a sludge or slurry from the thickener 6, to a rotary kiln 35 operating as a fluorine recovery kiln at a calcining temperature of about 2200° F. The exhaust gas of this first-stage calcination in the kiln 35 is delivered to the fluorine recovery plant, that is to the tower-type condenser 19 and associated equipment of Fig. 1. The calcine from the kiln 35 (called the first calcine) is suitably stored in a bin or the like 36 and is fed as required to a defluorinating kiln 37, together with a suitable reagent (or reagents) for increasing the refractoriness of the charge to withstand the high calcining temperature of about 2700° F. in the kiln 37. In the flow sheet of Fig. 2, the reagent is the reaction product of sodium carbonate (soda ash) and phosphoric acid in the proportions specified in the copending patent application of John E. Williams and myself Ser. No. 213,284, filed Feb. 28, 1951. Soda ash from the storage bin 38 and phosphoric acid from the storage tank 39 are mixed and blended, in the contemplated proportions, in the mixer 40, and the resulting reaction product is fed to the kiln 37 along with the first calcine in the contemplated relative proportions. The exhaust gas of the kiln 37 is delivered to the wash tower 2, with or without the intervention of a cyclone or equivalent duct collector as previously explained. The other equipment shown in the flow sheet of Fig. 2 is indicated by the same reference characters and performs the same functions as hereinbefore described in connection with the flow sheet of Fig. 1. The final clinker from the kiln 37 is substantially completely defluorinated (i. e. until it contains less than 1 part of fluorine per 40 parts of phosphorus). If necessary or desired the first calcine may be passed through a roll crusher 41 prior to delivery to the storage bin 36.

The flow sheet of Fig. 3 represents a slightly modified plant practice in which the present invention is embodied in a two-stage calcination process for defluorinating phosphatic material. The reagent (e. g. the reaction product of soda ash and phosphoric acid) is introduced into the aqueous slurry of fluorine-enriched phosphatic material from the thickener 6, the resulting mixture is fed to the dryer 9, and the dried mixture is delivered to the storage bin 10. The fluorine-recovery kiln 35 is fed with the dried mixture from the bin 10, and the kiln is operated at a temperature of about 2200° F. The exhaust gas of this first-stage calcination in the kiln 35 is passed through the cyclone 1 and delivered to the fluorine recovery plant. Dust from the cyclone is suitably mixed with the feed to the kiln 35. In this practice, the reagent for increasing the refractoriness of the charge (for the second stage calcination) is included in the calcining charge of the first stage calcination, and the amount of reagent currently introduced from the mixer 40 into the slurry from the thickener 6 is correlated to the amount of reagent recovered in the dust from the cyclone 1, as hereinbefore mentioned. In other respects, equipment and operation of the plant shown in Fig. 3 are the same as shown in Fig. 2, and corresponding equipment is indicated by the same reference characters.

The flow sheet of Fig. 4 illustrates an alternative method of introducing the raw phosphatic material to the fluorine-enrichment spray tower 2, the equipment and operation in other respects being the same as shown in Fig. 3. Finely ground or powdered raw phosphatic material from the storage bin 14' is blown into the exhaust gas stream from the second-stage defluorinating kiln 37. Fluorine compounds in the exhaust gas contact and react with constituents of the powdered phosphatic material capable of reacting therewith to form solid fluorine compounds, and the water sprays 3 and 4 in the tower 2 remove substantially all solid particles from the ascending gas stream. The fluorine-enriched phosphatic material is discharged from the bottom of the tower 2 into the thickener 6. The overflow of the thickener is delivered to the spray pipes 3 by a pump 15'.

In plants operating generally in accordance with the flow sheets of Figs. 2, 3 and 4, three or four second stage defluorinating kilns (37) for each first-stage fluorine-recovery kiln (35) are required for continuous operation. Otherwise, the first-stage kiln is operated only part time. With rotary kilns 120–180 feet long and 6–8 feet in diameter, the fluorine-recovery kiln 35 may be operated at a temperature of about 2200° F. with a feed of from 10 to 18 tons per hour. With raw phosphatic material containing 3.5–4% fluorine, the exhaust gas of the kiln (delivered to the fluorine recovery plant) will contain 2.0 to 2.9 pounds of fluorine per 1000 cubic feet of dry gas (S. T. P.) as compared with about 0.6–0.7 pounds per 1000 cubic feet in the exhaust gas of the defluorinating kiln 37. About 8–16 tons of calcine will be produced per hour in the fluorine recovery kiln 35, and this calcine will contain 1–3% of fluorine, depending mainly on the tonnage of material fed to the kiln per hour. The defluorinating kiln 37 may be operated at a temperature of about 2700° F. with a feed of 6–10 tons per hour, and the calcine from this kiln (with raw phosphatic material containing by analysis about 35% $P_2O_5$) will contain 0.2% or less fluorine. The fluorine-enriched phosphatic material discharged from the tower 2 will contain around 6% fluorine (on a dry basis), and at least 75% of this fluorine is readily volatilized at a calcining temperature of about 2200° F. in the fluorine recovery kiln 35.

In the plant represented by the flow sheet of Fig. 5, the dried fluorine-enriched phosphatic material, stored in the bin 10, is subjected to the fluorine-recovery heat-treatment described in my aforementioned patent application Ser. No. 310,207. The heat-treatment is carried out in an externally heated vertical retort or muffle furnace 42 at a temperature within the range of 1400 to 2200° F. in two stages, the first stage of which is conducted in the presence of a chlorine-containing agent (e. g. hydrogen chloride gas) and a large part of the fluorine of the fluorapatite is replaced by chlorine and the replaced fluorine is volatilized. The product of the first stage heat-treatment is directly and without cooling subjected to the second stage of heat-treatment in which a major part of its chlorine content is volatilized, and the volatilized chlorine, along with the volatilized replaced fluorine and the excess of hydrogen chloride, is withdrawn from the furnace as the gaseous product of the two-stage heat-treatment. This gaseous product is delivered to the fluorine recovery plant, where fluorine and hydrogen chloride are separately condensed and recovered, as for example in condensers similar to 19 and 21 of Fig. 1.

Hydrogen chloride (or equivalent gaseous chloridizing agent) is introduced into the vertical retort of the furnace 42 about midway of its length, the upper half of the retort being the zone or stage in which chloridizing calcination is carried out and the lower half of the retort being the zone or stage in which the dechloridizing calcination is carried out. The chlorine-fluorine ratio in the chloridizing zone is at least 10 to 1. The fluorine-enriched phosphatic material is not completely defluorinated in the furnace 42, and the calcine from the furnace, containing 1–3% fluorine, is conveyed to the storage bin 36, and fed to the defluorinating kiln 37. The fluorine-containing exhaust gas from the kiln 37 is delivered to the fluorine-enrichment equipment as hereinbefore described.

I claim:

1. The method of increasing the fluorine content of a fluorine-containing phosphatic material and recovering fluorine therefrom in a subsequent defluorinating calcination which comprises subjecting a partially-defluorinated fluorine-containing phosphatic material to defluorination by calcination with concomitant formation of an exhaust gas containing a gaseous fluorine compound volatilized in the course of calcination, passing the exhaust gas into contact with the fluorine-containing phosphatic material whose fluorine content is to be increased and which contains a constituent capable of and reacting with the gaseous fluorine compound in said exhaust gas to form a solid fluorine compound which is retained with said phosphatic material whose fluorine content is to be increased, continuing the contact of said exhaust gas with said last-mentioned phosphatic material until the fluorine content thereof is substantially increased, subsequently subjecting the resulting phosphatic material of increased fluorine content to a defluorinating calcination with concomitant formation of an exhaust gas containing a fluorine compound, and recovering said last-mentioned fluorine compound from the exhaust gas of said last-mentioned defluorinating calcination.

2. The method of claim 1 further characterized in that the calcine produced in the defluorinating calcination of said resulting phosphatic material of increased fluorine content is only partially defluorinated and contains at least 1% of fluorine and is subsequently subjected to defluorination by calcination and the exhaust gas thereof is passed into contact with fluorine-containing phosphatic material whose fluorine content is being increased.

3. The method of claim 1 further characterized in that said resulting phosphatic material of increased fluorine content mixed with from 10 to 30% by weight of solid carbonaceous material is subjected to defluorinating calcination at a temperature of at least 2000° F. in a chlorine-containing atmosphere in which chlorine is present in excess of the amount theoretically required to convert all of the calcium in the material to calcium chloride and fluorine is recovered from the gaseous reaction product of the calcination.

4. The method of claim 1 further characterized in that said resulting phosphatic material of increased fluorine content is subjected to defluorinating calcination at a temperature of at least 1400° F. but not so high that substantial fusion takes place in the presence of a chlorine-containing agent and thereby replacing a large part of the fluorine in said material with chlorine and volatilizing the replaced fluorine, and fluorine is recovered from the gaseous product of the calcination.

5. The method of claim 4 further characterized in that the calcine produced in the defluorinating calcination of said resulting phosphatic material of increased fluorine content is only partially defluorinated and contains at least 1% of fluorine and is subjected to said defluorination by calcination in which the exhaust gas thereof is passed into contact with fluorine-containing phosphatic material whose fluorine content is being increased.

6. In the defluorination of a phosphatic material in two stages of heat-treatment in which fluorine is recovered from the gaseous product of the first stage and the second stage is carried out at a substantially higher temperature than the first stage and the feed of the second stage is a partially defluorinated calcine produced in the first stage of heat-treatment, the improvement which comprises passing the exhaust gas containing a gaseous fluorine compound volatilized in the course of the second stage of heat-treatment into contact with phosphatic material containing a constituent capable of and reacting with the gaseous fluorine compound in said exhaust gas to form a solid fluorine compound which is retained with said phosphatic material and thereby substantially increases the fluorine content thereof, subjecting the resulting phosphatic material of increased fluorine content to the aforementioned first stage of heat-treatment in the course of which a large part but not all of its fluorine content is volatilized, and recovering fluorine from the gaseous product of said first-stage of heat-treatment.

7. In the defluorination of a phosphatic material according to claim 6 in which the temperature of the first stage of heat-treatment is about 2200° F. and the temperature of the second stage of heat-treatment is about 2700° F., continuing the contact of said exhaust gas with the phosphatic material until the fluorine content of the material is increased to at least about 6%.

8. In the defluorination of a phosphatic material according to claim 7, withdrawing from the first stage of heat-treatment a gaseous product in which the concentration of fluorine is at least 2 pounds per 1000 cubic feet of gas at standard temperature and pressure and producing a first stage calcine containing from about 1% to about 3% of fluorine.

References Cited in the file of this patent

UNITED STATES PATENTS

| | | |
|---|---|---|
| 2,093,176 | Tromel | Sept. 14, 1937 |
| 2,143,865 | Copson | Jan. 17, 1939 |
| 2,220,575 | Luscher | Nov. 5, 1940 |
| 2,337,498 | Ritter et al. | Dec. 21, 1943 |
| 2,442,969 | Butt | June 8, 1948 |
| 2,479,389 | Maust et al. | Aug. 16, 1949 |
| 2,531,046 | Hollingsworth | Nov. 21, 1950 |
| 2,539,638 | Schilling | Jan. 30, 1951 |

FOREIGN PATENTS

| | | |
|---|---|---|
| 7,636 of 1894 | Great Britain | Feb. 16, 185 |